United States Patent
Hopkins et al.

(10) Patent No.: US 10,157,540 B2
(45) Date of Patent: Dec. 18, 2018

(54) VEHICLE IDENTIFICATION SYSTEM AND METHOD

(71) Applicant: Kapsch TrafficCom AG, Vienna (AT)

(72) Inventors: Chris Hopkins, Georgetown (CA); Alastair Malarky, Petersburg (CA)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 15/946,363

(22) Filed: Apr. 5, 2018

(65) Prior Publication Data

US 2018/0293882 A1    Oct. 11, 2018

(30) Foreign Application Priority Data

Apr. 6, 2017 (EP) .................................. 17165144

(51) Int. Cl.

| | |
|---|---|
| *B60Q 9/00* | (2006.01) |
| *B60R 1/04* | (2006.01) |
| *B60R 1/12* | (2006.01) |
| *G07B 15/06* | (2011.01) |
| *G07C 9/00* | (2006.01) |
| *G06Q 99/00* | (2006.01) |
| *G08G 1/017* | (2006.01) |
| *G06K 7/10* | (2006.01) |

(52) U.S. Cl.
CPC ......... *G08G 1/017* (2013.01); *G06K 7/10425* (2013.01)

(58) Field of Classification Search
None
See application file for complete search history.

(56) References Cited

U.S. PATENT DOCUMENTS

| | | | |
|---|---|---|---|
| 4,808,803 A | 2/1989 | Magier et al. | |
| 6,085,081 A * | 7/2000 | Leskinen | H04W 76/11 455/406 |
| 7,512,236 B1 * | 3/2009 | Zhu | G06Q 20/027 380/255 |
| 8,751,092 B2 * | 6/2014 | Deniau | B60C 23/0418 340/442 |
| 8,967,476 B2 * | 3/2015 | Andresky | G06K 7/0008 235/451 |

(Continued)

OTHER PUBLICATIONS

Extended European Search report received for European Patent Application No. 17165144.1, dated Oct. 5, 2017, 11 pages.

*Primary Examiner* — Steven Lim
*Assistant Examiner* — Muhammad Adnan
(74) *Attorney, Agent, or Firm* — Fiala & Weaver P.L.L.C.

(57) ABSTRACT

The disclosed subject matter relates to a vehicle identification system comprising a central station, a roadside reader for wirelessly communicating with radio tags carried by vehicles, a mapping unit connected to the reader, and a correlation unit connected to the mapping unit, wherein the correlation unit is configured to correlate second-protocol tag identifications to first-protocol tag identifications from a reserved subset of first-protocol tag identifications, wherein the mapping unit is configured to generate a new first-protocol message upon receiving a second-protocol message from the reader, and wherein the central station is configured to receive and store first-protocol messages from the reader as well as new first-protocol messages from the mapping unit and to identify a vehicle. The disclosed subject matter further relates to a method for identifying vehicles by means of this system.

14 Claims, 3 Drawing Sheets

(56) References Cited

U.S. PATENT DOCUMENTS

| | | | | |
|---|---|---|---|---|
| RE46,206 | E | * | 11/2016 | Jorgensen ................. H04L 1/20 |
| 9,922,473 | B1 | * | 3/2018 | Haworth ............ G07C 9/00015 |
| 2003/0109223 | A1 | * | 6/2003 | Toyama ............... G07B 15/063 455/39 |
| 2006/0052099 | A1 | * | 3/2006 | Parker ................. H04L 65/1033 455/426.1 |
| 2006/0106671 | A1 | | 5/2006 | Biet |
| 2007/0034691 | A1 | * | 2/2007 | Davis ................. G06Q 20/3278 235/382 |
| 2007/0285256 | A1 | * | 12/2007 | Batra ...................... G01M 5/00 340/572.8 |
| 2009/0108992 | A1 | * | 4/2009 | Shafer .................... H04L 69/08 340/10.1 |
| 2013/0185001 | A1 | * | 7/2013 | Cardoso ............. G01M 15/102 702/24 |
| 2015/0088617 | A1 | * | 3/2015 | Geist ..................... G06Q 20/26 705/13 |
| 2015/0373160 | A1 | * | 12/2015 | Singh ...................... H04L 69/08 370/392 |
| 2016/0202069 | A1 | * | 7/2016 | Wippler, III ........... G01C 21/26 701/400 |
| 2016/0234313 | A1 | * | 8/2016 | Kellner ................... H04L 69/08 |
| 2017/0113619 | A1 | * | 4/2017 | Boehm .................... B60Q 9/00 |
| 2017/0178435 | A1 | * | 6/2017 | Posch ................. G07C 9/00309 |
| 2018/0013211 | A1 | * | 1/2018 | Ricci ................... B60L 11/1822 |
| 2018/0025551 | A1 | * | 1/2018 | Centner ............... G07B 15/063 705/13 |
| 2018/0025607 | A1 | * | 1/2018 | Sundaram .......... G08B 21/0277 455/456.1 |

\* cited by examiner

VEHICLE IDENTIFICATION SYSTEM AND METHOD

CROSS-REFERENCE TO RELATED APPLICATION

This application claims priority to European Patent Application No. 17 165 144.1, filed on Apr. 6, 2017, the entirety of which is incorporated by reference herein.

BACKGROUND

Technical Field

The present subject matter relates to a vehicle identification system comprising a central station and a roadside reader for wirelessly communicating with radio tags carried by vehicles, wherein a first tag is configured to wirelessly transmit messages according to a first protocol to the reader, each message comprising a unique first-protocol identification of the tag, and wherein a second tag is configured to wirelessly transmit messages according to a second protocol to the reader, each message comprising a unique second-protocol identification of the tag. The present subject matter further relates to a method for identifying a vehicle in such a system.

Background Art

In road toll systems, vehicles are equipped with radio tags according to a wireless communication standard such as RFID, NFC, WiFi, Bluetooth, et cet. so that they can be wirelessly identified during their travel within the road toll system. Multiple radio roadside readers are distributed over the road toll system that can detect a passing tag. Depending on the radio technology used, this can be achieved in that the readers continuously emit polling messages and await responses from the tags. By means of such readers, the route travelled by vehicles in the road toll system can be tracked.

Recently, there has been a need to ensure interoperability between multiple toll system operators tolling different geographical regions or even overlapping geographical regions. Each toll system operator distributes his own tags in the system, and the tags from different toll operators function according to different messaging protocols. Accordingly, tags may respond to readers with different message structures or may not respond at all when polled with the wrong protocol.

The problem has been approached by introducing multi-protocol readers (see, e.g., US 2003/0109223 A1) that, for each protocol available, transmit a data stream to a back office of the road toll system. This approach has the disadvantage that the back office as well as lane controllers and other parts of the system have to be physically upgraded to be able to handle messages of different protocols. Such system upgrades use a lot of resources and are very inefficient since back offices and lane controllers have to be upgraded with each toll system operator that is added to the system.

BRIEF SUMMARY

It is thus an aim of the disclosed subject matter to provide a vehicle identification system in which a plurality of toll system operators can function without an extensive overhaul of the road system.

To achieve this goal, in a first aspect the disclosed subject matter provides for a vehicle identification system comprising a central station, a roadside reader for wirelessly communicating with radio tags carried by vehicles, a mapping unit connected to the reader, and a correlation unit connected to the mapping unit;

the reader being part or member of a lane controller which has an interface connected to an input of the central station via a connection;

the reader having a first output which is connected to the interface and a second output which is connected to the mapping unit;

the mapping unit having an output which is also connected to the interface;

wherein a first tag is configured to wirelessly transmit messages according to a first protocol to the reader, each message comprising a unique first-protocol identification of the tag;

wherein a second tag is configured to wirelessly transmit messages according to a second protocol to the reader, each message comprising a unique second-protocol identification of the tag;

wherein the correlation unit is configured to correlate second-protocol tag identifications to first-protocol tag identifications from a reserved subset of first-protocol tag identifications that are not used for tags deployed in vehicles;

wherein the reader is configured to forward first-protocol messages to the central station and to detect second-protocol messages and forward the detected second-protocol messages to the mapping unit;

wherein the mapping unit is configured to generate a new first-protocol message and forward this message to the central station upon receiving a second-protocol message from the reader by extracting the second-protocol tag identification from the second-protocol message, retrieving that first-protocol tag identification that correlates to the extracted second-protocol tag identification from the correlation unit, generating said new first-protocol message by copying information from said second-protocol message according to a predetermined mapping between the second protocol and the first protocol while replacing the second-protocol tag identification by the retrieved first-protocol tag identification), and forwarding the generated new first-protocol message to the central station;

wherein the central station is configured to receive and store first-protocol messages from the reader as well as new first-protocol messages from the mapping unit and to identify a vehicle by means of the first-protocol tag identification therein.

The advantage of such a system is that for each toll system operator joining the already present group of toll system operators, only the correlation unit has to be updated. There is no need to include additional interfaces in lane controllers or the central station, thus making the need for hardware upgrades obsolete. By reserving subsets of unique tag identifications, possible upgrades for additional toll system operators in the future can be handled in advance. Furthermore, the central station only needs a single interface to receive messages since all messages are received according to a single protocol.

In the generation of the new first-protocol messages, the mapping may be unique such that it is clear that a mapping has occurred and so that it is reversible. This serves the purpose to re-create the original messages in later stages of the vehicle identification system.

In a further embodiment, the central station is also connected to said correlation unit or is connected to a further correlation unit having the same content;

wherein the central unit is configured to detect which received messages are new first-protocol messages by looking-up in the correlation unit or further correlation unit, respectively, if the tag identification of a received message is included in the reserved subset of first-protocol tag identifications;

and wherein the central station is further configured to forward a new first-protocol message detected in this way to a further central station.

By means of this, the central station can identify vehicles for which it is not responsible, e.g., for which no toll should be collected since they belong (are "subscribed") to a different toll system operator. The correlation unit thus serves two purposes, firstly to be able to map messages to a different protocol and secondly to identify messages that have been mapped. The dual-purpose correlation unit thus alleviates the distribution of messages to the different toll system operators.

In another embodiment, a further mapping unit is interposed between the central unit and the further central unit and is configured to reconstruct the second-protocol message upon receiving said detected new first-protocol message from the central station by
- extracting the first-protocol tag identification from said detected new first-protocol message;
- retrieving that second-protocol tag identification that correlates to the extracted first-protocol tag identification from the correlation unit; and
- reconstructing said second-protocol message by copying information from said new first-protocol message according to a predetermined mapping between the first protocol and the second protocol while replacing the first-protocol tag identification by the retrieved second-protocol tag identification;

and wherein the further mapping unit is configured to forward said reconstructed second-protocol message to the further central unit.

By means of this, messages can be mapped back, i.e., re-constructed, to their original protocols. Receiving central stations thus do not recognize that messages have been transformed at all such that the disclosed vehicle identification system is also compatible with legacy central stations and readers. This further enhances the backwards compatibility of the vehicle identification system.

In one embodiment, the correlation unit is a database. Thereby, all correlations between tag identifications can be arbitrarily pre-defined and tag identifications can be added to the database on an individual basis.

Alternatively, the correlation unit is a computing unit configured to execute a pre-defined algorithm. Thereby, correlations can be computed "on the fly" such that no extended storage is needed. Also, new tags can join the group of already existing tags if their tag identifications are comprised by the computing range of the algorithm.

In a second aspect, the disclosed subject matter relates to a method for identifying a vehicle in a system comprising a central station, a roadside reader for wirelessly communicating with radio tags carried by vehicles, a mapping unit connected to the reader, and a correlation unit connected to the mapping unit, the reader being part or member of a lane controller which has an interface connected to an input of the central station via a connection, the reader having a first output which is connected to the interface and a second output which is connected to the mapping unit, and the mapping unit having an output which is also connected to the interface, the method comprising:
- providing a correlation in the correlation unit between second-protocol tag identifications and first-protocol tag identifications from a reserved subset of first-protocol tag identifications that are not used for tags deployed in vehicles;
- wirelessly transmitting a message according to the first protocol from a first tag to the reader, the message comprising a unique first-protocol identification of the tag;
- wirelessly transmitting a message according to the second protocol from a second tag to the reader, the message comprising a unique second-protocol identification of the tag;
- selectively forwarding the first-protocol message from the reader to the central station and the second-protocol message from the reader to the mapping unit;
- in the mapping unit, generating and forwarding to the central station a new first-protocol message by
  - extracting the second-protocol tag identification from the second-protocol message,
  - retrieving that first-protocol tag identification that correlates to the extracted second-protocol tag identification from the correlation unit, and
  - generating said new first-protocol message by copying information from said second-protocol message according to a predetermined mapping between the second protocol and the first protocol while replacing the second-protocol tag identification by the retrieved first-protocol tag identification, and
  - forwarding the generated new first-protocol message to the central station;
- in the central station, receiving and storing the first-protocol message from the reader as well as the new first-protocol message from the mapping unit and identifying a vehicle by means of the first-protocol tag identification therein.

In a further embodiment the central station is also connected to said correlation unit or is connected to a further correlation unit having the same content, and the method comprises:
- in the central unit, detecting whether a received message is a new first-protocol message by looking-up in the correlation unit or further correlation unit, respectively, if the tag identification of the received message is included in the reserved subset of first-protocol tag identifications, and, if so,
- forwarding the new first-protocol message detected in this way to a further central station.

In another embodiment a further mapping unit is interposed between the central unit and the further central unit, and the method comprises:
- in the further mapping unit, reconstructing the second-protocol message upon receiving said detected new first-protocol message from the central station by
  - extracting the first-protocol tag identification from said detected new first-protocol message;
  - retrieving that second-protocol tag identification that correlates to the extracted first-protocol tag identification from the correlation unit; and
  - reconstructing said second-protocol message by copying information from said new first-protocol message according to a predetermined mapping between the first protocol and the second protocol while replacing the first-protocol tag identification by the retrieved second-protocol tag identification;

and forwarding said reconstructed second-protocol message from the further mapping unit to the further central unit.

In one embodiment, the correlation unit is a database. Alternatively, the correlation unit is a computing unit executing a pre-defined algorithm.

The advantages as set forth for the vehicle identification system analogously hold for the method for identifying a vehicle.

BRIEF DESCRIPTION OF THE DRAWINGS/FIGURES

The disclosed subject matter shall now be explained in more detail below on the basis of exemplary embodiments thereof with reference to the accompanying drawings, in which.

DETAILED DESCRIPTION

Figure 1:
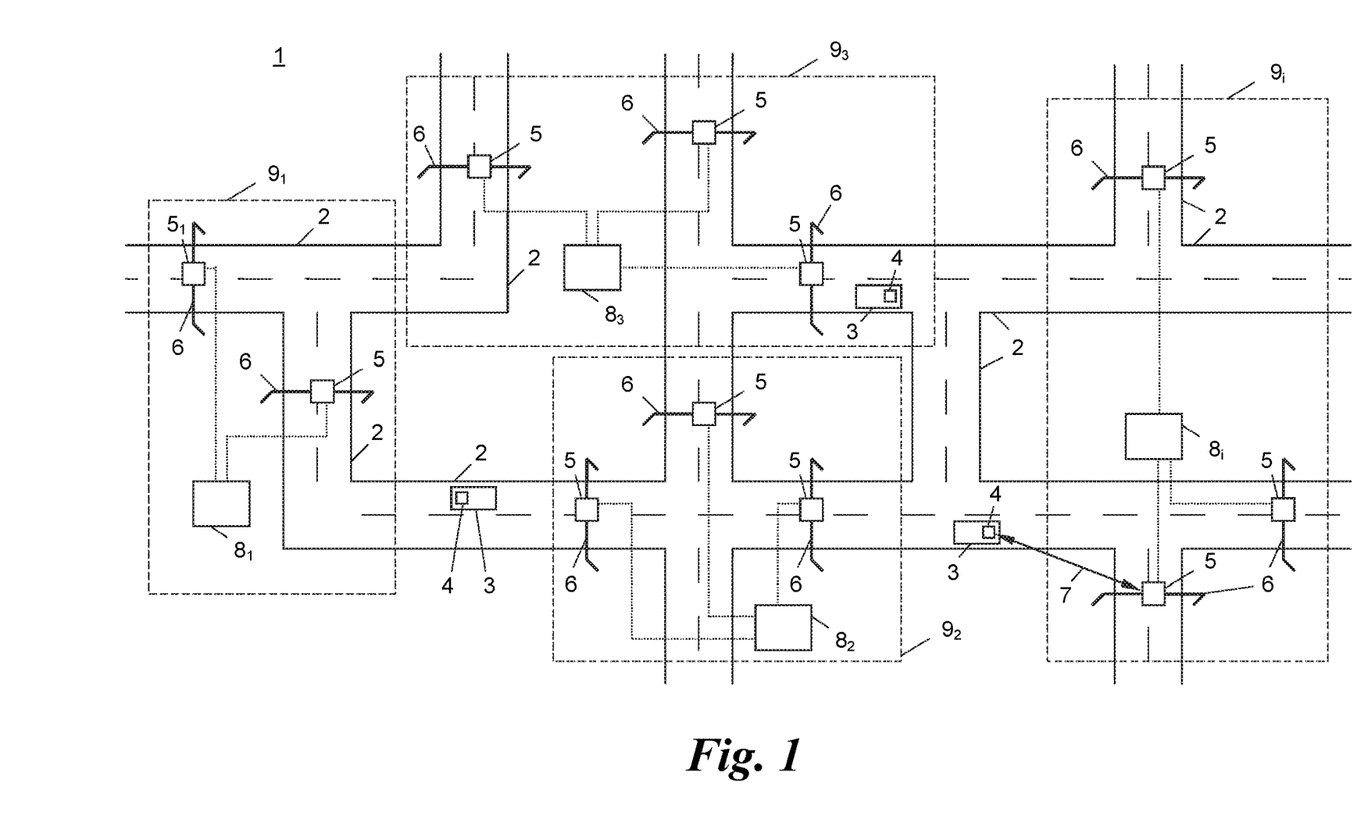
FIG. 1 shows a road toll system in a schematic top view.

FIG. 1 shows a road toll system 1 with roads 2 on which vehicles 3 travel. The vehicles 3 carry tags 4, for example in form of onboard units, by means of which the vehicles 3 can be identified in the road toll system 1. The identification of vehicles 3 in the road toll system 1 can for example serve to impose toll on certain roads 2.

To identify vehicles 3 on the roads 2, roadside readers 5 are installed on certain sections of the roads 2. The roadside readers 5 can be mounted on gantries 6, e.g., overhead gantries. The readers 5 and the tags 4 wirelessly communicate with each other according to a wireless communication standard such as RFID, NFC, WiFi, Bluetooth, or the like. To initiate a communication, the readers 5 can, e.g., continuously emit polling messages, to which the tags 4 respond with a message 7, or vice versa.

The readers 5 thus receive messages 7 and report these messages 7 back to one of several central stations $8_i$ (i=1, 2, 3, . . . ) used as "back offices", if applicable in combination with a timestamp, location and/or identification of the respective reader 5, et cet.

The messages 7 from the tags 4 typically contain a unique identification of the tag 4, data relating to the type of the tag 4, and content of a memory of the tag 4 relating to, for example, previous reader passages, personal information of the vehicle owner, or information relating to the vehicle 3.

From FIG. 1 it can further be seen that each central station $8_i$ is responsible for a distinct geographical region $9_i$. All readers 5 in this geographical region $9_i$ are connected to the central station $8_i$ in which the respective reader 5 is deployed, i.e., each reader 5 is assigned to one central station $8_i$. For this reason the readers 5 will from now on be denoted as readers $5_i$, wherein the index i indicates the affiliation to the central station $8_i$ with the same index i.

In different embodiments, the geographical regions $9_i$ are not mutually exclusive but can overlap such that mixed areas, in which readers $5_i$ from different groups i both report messages $7_i$ back to different central stations $8_i$, are created.

The tags 4 may be handed out to the customers of a toll operator operating a central station $8_i$ for a specific geographical region $9_i$ such that these tags 4 are affiliated to the central station $8_i$ with the index i, too. Thus, they are denoted as tags $4_i$ in the following.

To ensure a consistent communication within the region $9_i$ of one toll operator, messages 7 between the tags $4_i$, readers $5_i$, and the central station $8_i$ of a single toll operator are performed according to a pre-defined protocol $10_i$. For this reason, messages 7 can also be denoted as messages $7_i$.

Messages $7_i$ according to different protocols $10_i$ here means that the messages $7_i$ use a different structure of the data or information contained therein, as will be discussed later in detail with reference to FIG. 3. Exemplary protocols $10_i$ used in the road toll system 1 are E-ZPass TDM (Time Division Multiplexing), NIOP TDM, 6C by the Toll Operators Coalition, and the like.

Each group i of tags $4_i$ may use its own pool of tag identifications $TID_i$ such that each tag identification $TID_i$ is unique within each group, meaning that a tag $4_i$ can have a tag identification $TID_i$ of, e.g., "12345", and this tag identification "12345" is only present once within a group i. However, this tag identification "12345" could be used in a different group i+1, for example, if this group i+1 uses a different protocol $10_{i+1}$. Furthermore, tag identifications $TID_i$ can have different lengths between different groups i+1, for example group i can use 30-bit tag identifications $TID_i$ while the group i+1 uses 40-bit tag identifications $TID_{i+1}$.

As vehicles 3 roam freely on the roads 2 and thus between different geographical regions $9_i$, the readers $5_i$ and back offices $8_i$ should to be configured to deal with tags $4_i$ of different toll operators. An example of this is shown in FIG. 2, in which an exemplary interaction between tags $4_1$, $4_2$, readers $5_1$, $5_2$, and central stations $8_1$, $8_2$ of two different groups i=1, 2 run by toll operators from two different regions $9_1$, $9_2$ is depicted.

Figure 2:
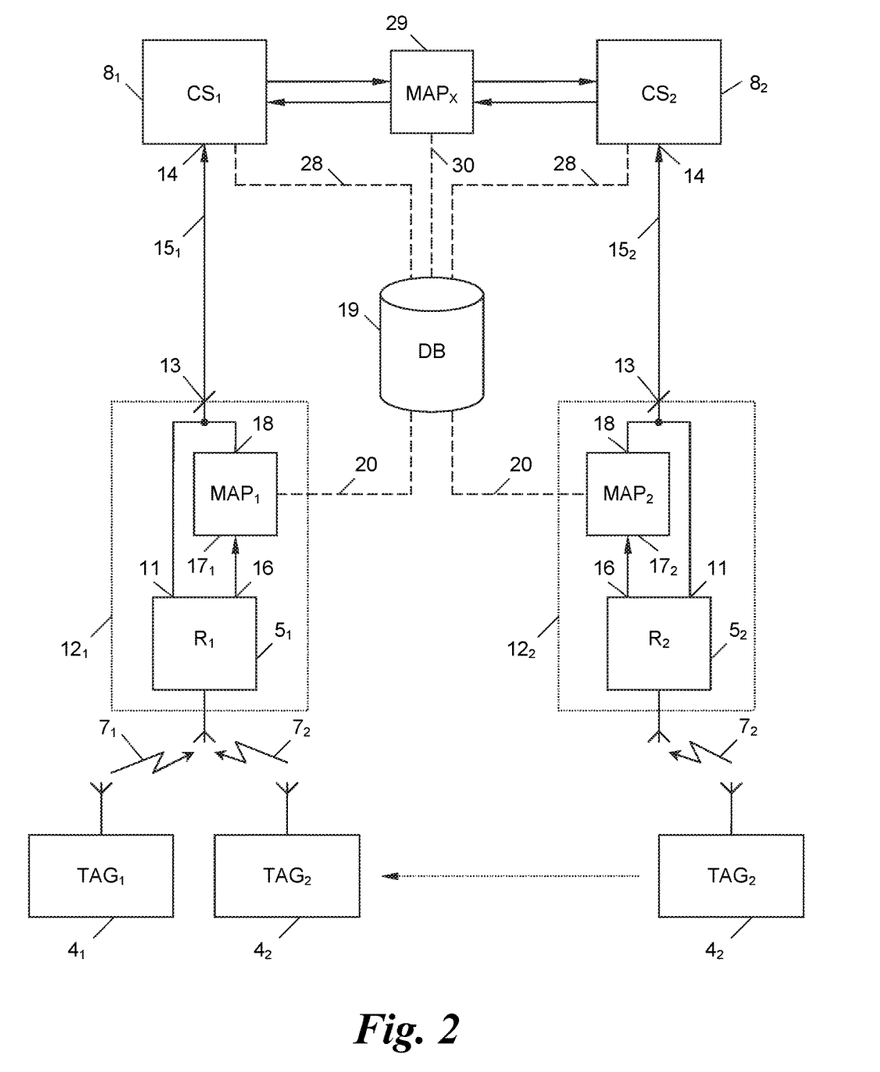
FIG. 2 shows a block diagram of readers and central stations of the road toll system of FIG. 1.

In FIG. 2, when the tag $4_1$ communicates a message $7_1$ according to the first protocol $10_1$ to its "native" reader $5_1$, this first-protocol message $7_1$ is present in the "correct" protocol $10_1$ at an output 11 of the reader $5_1$. The reader $5_1$ may be part or member of a lane controller $12_1$, which has an interface 13, which is connected to the output 11 of the reader $5_1$. The interface 13 of the lane controller $12_1$ is in turn connected to an input 14 of the central station $8_1$ responsible for the region $9_1$ via a connection $15_1$. While the reader $5_i$ is a "multi-protocol" reader meaning that it can receive messages $7_i$ according to at least two protocols $10_i$, $10_{i+1}$ as detailed below, for the central station $8_1$ all messages conveyed via the connection $15_1$ are present as first-protocol messages $7_1$, so that the central station $8_i$ needs to and can only parse messages according to its native protocol $10_1$.

When a tag $4_2$ native to a different protocol group, here group i=2, roams into the vicinity of a reader $5_1$ of the group i=1, it transmits messages $7_2$ according to the second protocol $10_2$ to the reader $5_1$. The multi-protocol reader $5_1$ detects that a message was received according to the second protocol $10_2$ by means of, e.g., the structure of the message $7_2$, and outputs it at an output 16 to the input of a mapping unit $17_1$. The mapping unit $17_1$ has the task to generate a "new" first-protocol message $7_1'$ upon receiving such a second-protocol message $7_2$, which second protocol $10_2$ is not "native" to the region $9_i$ in which the reader $5_1$ is deployed. For this purpose, the mapping unit $17_i$ is connected to a correlation unit 19 via a connection 20. The correlation unit 19 can be embodied as a database DB as shown or alternatively as a computing unit executing a pre-defined algorithm. While the following example refers specifically to embodiments using the database DB, the computing unit can be used as the correlation unit 19 to the same effect.

After generating such a new first-protocol message $7_1'$ out of a second-protocol message $7_2$, the mapping unit $17_1$ outputs the new first-protocol message $7_1'$ at an output 18 to the interface 13, from where it is fed to the input 14 of the central station $8_1$ via the connection 15. In this way, between the interface 13 of the lane controller $12_1$ and the input 14 of the central station $8_1$ and within the central station $8_1$, only first-protocol messages $7_1$, $7_1'$ need to be transmitted and processed, regardless of the protocol $10_i$ of a message $7_i$ received by the reader $5_1$.

Figure 3:
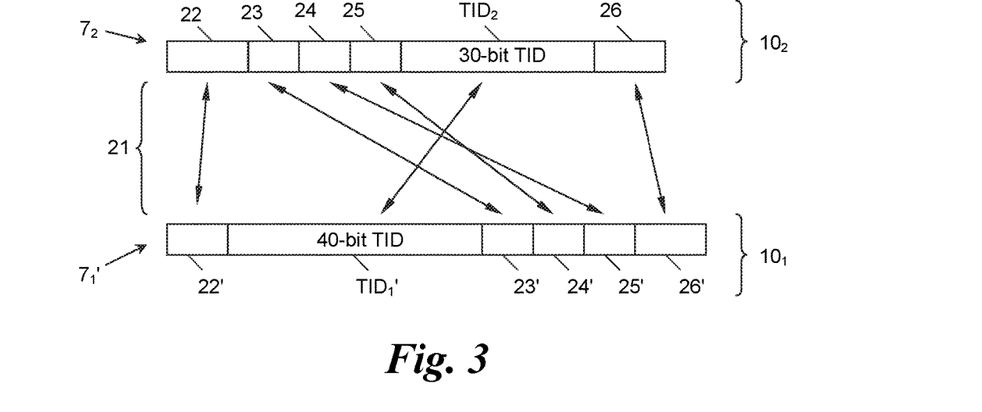
FIG. 3 shows a schematic mapping of a message according to a first protocol to a message according to a second protocol.
Figure 4:
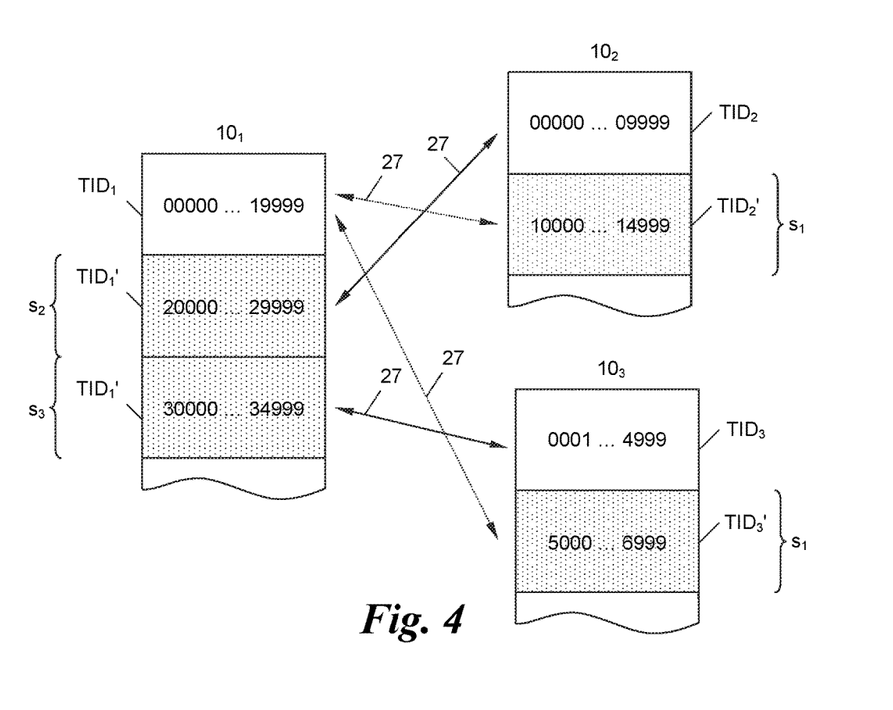
FIG. 4 shows a correlation of tag identifications between two protocols.

In the following, FIGS. 3 and 4 show an exemplary way of generating a new first-protocol message $7_1'$ by means of the mapping unit $17_1$. FIG. 3 depicts a predetermined mapping 21 which is used by the mapping unit $17_1$ to generate a first-protocol message $7_1'$ out of a second-protocol message $7_2$. As can be seen, a header 22 is mapped from the beginning of the second-protocol message $7_2$ to a new header 22' at the beginning of the new first-protocol message $7_1'$. The tag identification $TID_i$ is mapped from, e.g., the middle of the second-protocol message $7_2$ to, for example, a second data field of the new first-protocol message $7_1'$. Concurrently, the second-protocol tag identification $TID_2$ is replaced by a new first-protocol tag identification $TID_1'$ as will be described below by means of FIG. 4 in detail. A class data value 23, an HOV (high occupancy vehicle) data value 24, and a version data value 25 are mapped from the second-protocol message $7_2$ to a new class data value 23', a new HOV data value 24', and a new version data value 25', e.g., from data fields before the tag identification $TID_2$ to data fields after the new tag identification $TID_1'$. The last data field of the second-protocol message $7_2$ is, in this case, a CRC (cyclic redundancy check) value 26 of the second-protocol message $7_2$ that is validated before mapping. A new CRC value 26' is computed as part of generating the new first-protocol message $7_1'$ and added as a last data field to the new first-protocol message $7_1'$. In this way, a new first-protocol message $7_1'$ can be computed out of the second-protocol message $7_2$.

As mentioned above, FIG. 4 shows the content of the database DB used as the correlation unit 19, wherein unique tag identifications $TID_i$ of three protocols $10_1$, $10_2$, $10_3$ are shown. On the left, "actual" tag identifications ranging from "00000" to "19999" are shown, which are assigned to tags $4_1$ that operate according to the first protocol $10_1$. Additionally, two reserved subsets $s_2$, $s_3$ ranging from "20000" to "29999" and "30000" to "34999", respectively, of the unique tag identifiers $TID_1$ of the first protocol $10_1$ are depicted. These reserved subsets $s_2$, $s_3$ contain "virtual" tag identifications $TID_1'$ that are not used for tags $4_i$ deployed in vehicles 3.

Similarly, on the top right of FIG. 4, unique tag identifications $TID_2$ of a second protocol $10_2$ are shown, which are again split up into actual and virtual tag identifications $TID_2$, $TID_2'$. On the bottom right of FIG. 4, unique tag identifications $TID_3$ of a third protocol $10_3$ are shown split up into actual and virtual tag identifications $TID_3$, $TID_3'$.

If a computing unit executing a pre-defined algorithm is used as the correlation unit 19, the algorithm could utilize any arithmetic function that allows a correlation between two tag identifications, e.g., $TID_i=3*TID_i'+10000$. The algorithm could also include if-statements to account for different lengths of tag identifications.

To implement the replacement of a tag identification $TID_2$ in a mapping 21 as was explained above with respect to FIG. 3, the actual tag identifications $TID_2$ of the second protocol $10_2$ are correlated, see arrows 27, to the second subset $s_2$ of the first-protocol tag identifications $TID_1$, i.e., each actual second-protocol tag identification $TID_2$ is correlated to one virtual first-protocol tag identification $TID_1'$.

For the purpose of replacing a third-protocol tag identification $TID_3$, analogously the actual tag identifications $TID_3$ of the third protocol $10_3$ are correlated to the third subset $s_3$ of the first-protocol tag identifications $TID_1$. From the exemplary correlation 27 between the first protocol $10_1$ and the third protocol $10_3$ it can also be seen that a possible change in (bit-) length of the tag identifications $TID_i$ can be overcome this way.

Furthermore, the database DB can store such correlations 27 from the actual tag identifications $TID_1$ of the first protocol $10_1$ to a respective subset $s_1$ of the second-protocol tag identifications $TID_2$ and to a respective subset $s_1$ of third-protocol tag identifications $TID_3$ (shown in dotted lines), and all other possible correlations (not shown).

Coming back to FIG. 2, it can thus be summarized that the mapping unit $17_1$ generates a new first-protocol message $7_1'$ upon receiving a second-protocol message $7_2$ from the reader $5_1$ by means of three steps: Firstly, the second-protocol tag identification $TID_2$ is extracted from the second-protocol message $7_2$. Secondly, that first-protocol tag identification $TID_1$ that correlates to the extracted second-protocol tag identification $TID_2$ is retrieved from the database DB according to the correlation 27 in the database DB (FIG. 4). Thirdly, said new first-protocol message $7_1'$ is generated by copying information from said second-protocol message $7_2$ according to the predetermined mapping 21 between the second protocol $10_2$ and the first protocol $10_1$ while replacing the second-protocol tag identification $TID_2$ by the retrieved first-protocol tag identification $TID_1$ (FIG. 3).

Once messages $7_1$, $7_1'$ have been received in the central station $8_1$, the vehicles 3 can be identified by means of these messages, in particular by the actual or virtual tag identifications $TID_1$, $TID_1'$ therein. Identified vehicles 3 can then be tolled on the basis of their locations and/or used roads 2.

In most cases, vehicles 3 that are equipped with a tag $4_i$ from a different toll operator should, however, only be tolled by the central station $8_i$ of this agency. To this end, the central station $8_i$ can detect whether a message $7_i$, $7_i'$ was mapped by means of the mapping unit $17_i$ by accessing the database DB via a connection 28. The central station $8_i$ then checks whether the tag identification $TID_i$ stored in a message $7_i$, $7_i'$ is present in a reserved subset $s_i$ as shown in FIG. 4. If this is the case, the central station $8_i$ can forward this message $7_i'$, which was apparently mapped by means of the mapping unit $17_i$, to that central station $8_i$ (here: the "further" central station $8_2$), which belongs to that reserved subset $s_i$ in which the tag identification $TID_i$ was found.

As can be seen from FIG. 2, instead of just forwarding a message $7_i$, $7_i'$, this message can also be mapped back to the protocol $10_i$ in which it was originally received in the reader $5_i$. For this purpose, a further mapping unit 29 is located downstream of the central station $8_i$, e.g., interposed between the central station $8_1$ and the further central station $8_2$. The further mapping unit 29 reconstructs the second-protocol message $7_2$ as follows.

Firstly, the first-protocol tag identification $TID_1$ is extracted from said detected new first-protocol message $7_1'$. Secondly, the further mapping unit 29 retrieves that second-protocol tag identification $TID_2$ that correlates (27) to the extracted first-protocol tag identification $TID_1$ from the database DB. Thirdly, said second-protocol message $7_2$ is reconstructed by copying information from said new first-protocol message $7_1'$ according to the predetermined mapping 21 between the first protocol $10_1$ and the second protocol $10_2$ while replacing the first-protocol tag identification $TID_1$ by the retrieved second-protocol tag identification $TID_2$.

For the purpose of mapping back the extracted tag identification $TID_1$, the further mapping unit 29 is connected to the correlation unit 19 via a connection 30. However, the further mapping unit 29 could also be arranged in the central station $8_i$ that forwards the message $7_1'$, or in that central station $8_1$ that receives the message $7_1'$. In this case, the connection 28 and the connection 30 can be embodied as one.

The correlation unit 19 could, instead of being a central correlation unit that is connected to each element, be embodied within each central station $8_i$ or mapping unit $17_i$. In the example of FIG. 2, this would mean that the correlation unit 19 would be present five times in the system, embodied in the mapping units $17_1$, $17_2$, 29 and in the central stations $8_1$, $8_2$. Such multiple correlation units 19 embodied as databases DB would then have substantially the same content. In case of any changes, such databases DB could be updated or synchronised, e.g., on a regular basis. If, on the other hand, computing units are used as such multiple correlation units 19, they would then use the same algorithm. In case of any changes, the algorithms of computing units could be updated or synchronised, e.g., on a regular basis.

The disclosed subject matter is not restricted to the specific embodiments described in detail herein, but encompasses all variants, combinations and modifications thereof that fall within the framework of the appended claims.

What is claimed is:

1. A vehicle identification system comprising a central station, a roadside reader for wirelessly communicating with radio tags carried by vehicles, a mapping unit connected to the reader, and a correlation unit connected to the mapping unit;
   the reader being part or member of a lane controller which has an interface connected to an input of the central station via a connection;
   the reader having a first output which is connected to the interface and a second output which is connected to the mapping unit; and
   the mapping unit having an output which is also connected to the interface;
   wherein a first tag is configured to wirelessly transmit messages according to a first protocol to the reader, each message comprising a unique first-protocol identification of the tag;
   wherein a second tag is configured to wirelessly transmit messages according to a second protocol to the reader, each message comprising a unique second-protocol identification of the tag;
   wherein the correlation unit is configured to correlate second-protocol tag identifications to first-protocol tag identifications from a reserved subset of first-protocol tag identifications that are not used for tags deployed in vehicles;
   wherein the reader is configured to forward first-protocol messages to the central station and to detect second-protocol messages and forward the detected second-protocol messages to the mapping unit;
   wherein the mapping unit is configured to generate a new first-protocol message and forward this message to the central station upon receiving a second-protocol message from the reader by
      extracting the second-protocol tag identification from the second-protocol message,
      retrieving that first-protocol tag identification that correlates to the extracted second-protocol tag identification from the correlation unit,
      generating said new first-protocol message by copying information from said second-protocol message according to a predetermined mapping between the second protocol and the first protocol while replacing the second-protocol tag identification by the retrieved first-protocol tag identification, and
      forwarding the generated new first-protocol message to the central station; and
   wherein the central station is configured to receive and store first-protocol messages from the reader as well as new first-protocol messages from the mapping unit and to identify a vehicle by means of the first-protocol tag identification therein.

2. The vehicle identification system according to claim 1, wherein the central station is also connected to said correlation unit or is connected to another correlation unit having the same content,
   and wherein the central station is configured to detect which received messages are new first-protocol messages by looking-up in the correlation unit or the other correlation unit, respectively, if the tag identification of a received message is included in the reserved subset of first-protocol tag identifications,
   and is further configured to forward a new first-protocol message detected in this way to another central station.

3. The vehicle identification system according to claim 2, wherein another mapping unit is interposed between the central station and the other central station and is configured to reconstruct the second-protocol message upon receiving said detected new first-protocol message from the central station by
   extracting the first-protocol tag identification from said detected new first-protocol message,
   retrieving that second-protocol tag identification that correlates to the extracted first-protocol tag identification from the correlation unit, and
   reconstructing said second-protocol message by copying information from said new first-protocol message according to a predetermined mapping between the first protocol and the second protocol while replacing the first-protocol tag identification by the retrieved second-protocol tag identification;
   and wherein the other mapping unit is further configured to forward said reconstructed second-protocol message to the other central station.

4. The vehicle identification system according to claim 1, wherein the correlation unit is a database.

5. The vehicle identification system according to claim 1, wherein the correlation unit is a computing unit configured to execute a pre-defined algorithm.

6. The vehicle identification system according to claim 3, wherein the other correlation unit is a database.

7. The vehicle identification system according to claim 3, wherein the other correlation unit is a computing unit configured to execute a pre-defined algorithm.

8. A method for identifying a vehicle in a system comprising a central station, a roadside reader for wirelessly communicating with radio tags carried by vehicles, a mapping unit connected to the reader, and a correlation unit connected to the mapping unit, the reader being part or member of a lane controller which has an interface connected to an input of the central station via a connection, the reader having a first output which is connected to the interface and a second output which is connected to the mapping unit, and the mapping unit having an output which is also connected to the interface, the method comprising:

providing a correlation in the correlation unit between second-protocol tag identifications and first-protocol tag identifications from a reserved subset of first-protocol tag identifications that are not used for tags deployed in vehicles;

wirelessly transmitting a message according to the first protocol from a first tag to the reader, the message comprising a unique first-protocol identification of the tag;

wirelessly transmitting a message according to the second protocol from a second tag to the reader, the message comprising a unique second-protocol identification of the tag;

selectively forwarding the first-protocol message from the reader to the central station and the second-protocol message from the reader to the mapping unit;

in the mapping unit, generating and forwarding to the central station a new first-protocol message by         extracting the second-protocol tag identification from the second-protocol message,         retrieving that first-protocol tag identification that correlates to the extracted second-protocol tag identification from the correlation unit, and         generating said new first-protocol message by copying information from said second-protocol message according to a predetermined mapping between the second protocol and the first protocol while replacing the second-protocol tag identification by the retrieved first-protocol tag identification, and         forwarding the generated new first-protocol message to the central station; and     in the central station, receiving and storing the first-protocol message from the reader as well as the new first-protocol message from the mapping unit and identifying a vehicle by means of the first-protocol tag identification thereof.

9. The method according to claim 8, wherein the central station is also connected to said correlation unit or is connected to another correlation unit having the same content, the method comprising:

in the central station, detecting whether a received message is a new first-protocol message by looking-up in the correlation unit or the other correlation unit, respectively, if the tag identification of the received message is included in the reserved subset of first-protocol tag identifications, and, if so,     forwarding the new first-protocol message detected in this way to another central station.

10. The method according to claim 9, wherein another mapping unit is interposed between the central station and the other central station, the method comprising:

in the other mapping unit, reconstructing the second-protocol message upon receiving said detected new first-protocol message from the central station by         extracting the first-protocol tag identification from said detected new first-protocol message,         retrieving that second-protocol tag identification that correlates to the extracted first-protocol tag identification from the correlation unit, and         reconstructing said second-protocol message by copying information from said new first-protocol message according to a predetermined mapping between the first protocol and the second protocol while replacing the first-protocol tag identification by the retrieved second-protocol tag identification; and     and forwarding said reconstructed second-protocol message from the other mapping unit to the other central station.

11. The method according to claim 8, wherein the correlation unit is a database.

12. The method according to claim 8, wherein the correlation unit is a computing unit executing a pre-defined algorithm.

13. The method according to claim 10, wherein the other correlation unit is a database.

14. The method according to claim 10, wherein the other correlation unit is a computing unit executing a pre-defined algorithm.

* * * * *